FIGURE I

EFFECT OF PERCENTAGE YIELD AND SELECTIVITY TO PROPYLENE EPISULPHIDE AND CONVERSION OF PROPYLENE OXIDE AS A FUNCTION OF REACTANT MOLE RATIO

RONALD C. VANDER LINDEN
JUAN M. SALVA   INVENTORS
PETER A. C. SMITH

BY

PATENT ATTORNEY

REACTION OF PROPYLENE OXIDE WITH CARBON DISULPHIDE
YIELD OF PROPYLENE EPISULPHIDE AS A FUNCTION OF REACTION TEMPERATURE

REACTION OF PROPYLENE OXIDE WITH CARBON DISULPHIDE
EXTENT OF PROPYLENE OXIDE CONVERSION AS A FUNCTION OF TEMPERATURE

United States Patent Office 3,542,808
Patented Nov. 24, 1970

3,542,808
SYNTHESIS OF EPISULFIDES
Ronald C. Vander Linden and Juan M. Salva, Sarnia, Ontario, and Peter A. C. Smith, Petrolia, Ontario, Canada, assignors to Esso Research and Engineering Company, a corporation of Delaware
Filed Jan. 4, 1966, Ser. No. 518,591
Int. Cl. C07d 95/00
U.S. Cl. 260—327                    14 Claims

ABSTRACT OF THE DISCLOSURE

Episulfide compounds are synthesized by reacting either a saturated or unsaturated epoxide with carbon disulfide or carbonyl sulfide in the presence of a magnesium oxide, magnesium hydroxide, or barium sulfide catalysts. Conventionally the reaction is conducted in the vapor phase at temperatures ranging from 30 to 400° C.

---

Figure 1:
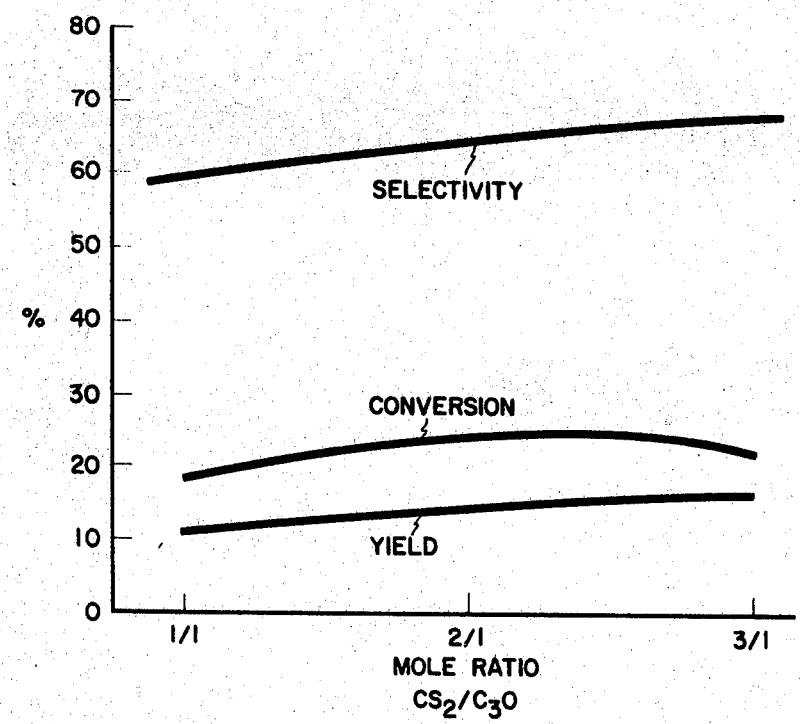

The present invention relates to an improved process for the economic synthesis of episulfides by reacting saturated or unsaturated epoxides in the vapor phase with carbonyl sulfide, COS, or carbon disulfide, $CS_2$. More particularly, this invention relates to obtaining high initial selectivities, e.g. up to 70%, along with good conversions, e.g. up to 45%, specifically by conducting the reaction in the presence of magnesium oxide or hydroxide or barium sulfide. Most particularly, in a preferred embodiment this invention relates to carrying out the reaction at temperatures of 30–400° C. in the presence of the following solid catalysts: MgO, $Mg(OH)_2$ or BaS.

Highly reactive olefin episulfides of the type of ethylene episulfide and propylene episulfide are clearly recognized to be potentially valuable chemical monomers useful for the preparation of various polymers and a variety of other uses. However, volume use of these materials has to the present awaited an economic method for their synthesis. Such an economic synthesis is provided by the present process.

The catalysts of the present invention may be used alone or supported on standard supports such as asbestos, aluminas, activated carbon, etc. Preferably, the supports, if used, are nonacidic or treated, e.g. with an aqueous base, to be nonacidic since cyclic sulfides dimerize to dithiane derivatives when heated with acidic catalysts. The form of the catalyst is preferably granular or pellets.

The catalyst is normally used in an anhydrous condition. However, it has been found that small additions of water tend to increase the resultant yield of episulfide due to increased conversion of the epoxide at similar levels of episulfide selectivity. Therefore, it is preferable to add water in amounts of about 0.5–2.5 mole percent based on the reactants; about 1.0 mole percent being particularly preferred.

The catalysts may be used as is or they may be pretreated by calcining at temperatures ranging from 150–450° C. for about 0.5–3.5 hours in a helium atmosphere. Calcining results in the removal of moisture from the catalyst. In the examples set forth below calcined catalysts were utilized in order to limit catalyst hydration, and therefore maintain reproducible surface areas and reproducible results. Calcining, if used, is preferably carried out under the following conditions:

MgO—about 0.5–2.5 hrs. at about 400–450° C.
$Mg(OH)_2$—about 0.5–1.0 hrs. at about 150–200° C.
BaS—about 0.5–2 hrs. at about 200–250° C.

It should be noted that in a continuous reaction an untreated catalyst will usually have its moisture driven off as a result of the reaction temperatures.

Suitable feedstocks for use in the present invention are unsaturated organic epoxide feeds, preferably gaseous feeds or feeds capable of being converted to a gas without decomposition as follows:

(a) $C_2$ to $C_{12}$, preferably $C_2$ to $C_9$, branched and straight chain monoolefin epoxides including epoxides containing other functional groups such as aryl groups, carboxyl groups, chlorine, fluorine, etc., e.g. epoxides of the following: ethylene, propylene, isobutylene, 1-butene, 2-butene, 2-methyl-1-butene, pentenes, hexenes, heptenes, dodecenes, styrene, oleic acid, etc.

(b) Same range for epoxides of cyclic monoolefins and substituted cyclic monoolefins, and alkyl, aryl, carboxyl, chlorine and fluorine substituted cyclic monoolefins, beginning with the $C_3$ ring, e.g. epoxides of cyclobutene, cyclopentene, cyclohexene, cyclohepten, cyclooctene, alkyl substituted derivatives thereof, cyclopentenecarboxylic acid, cyclohexenecarboxylic acid, cinnamic acid, etc.

(c) Same range for branched and straight chain unconjugated diolefin epoxides and alkyl, aryl, carboxyl, chlorine and fluorine substituted unconjugated diolefin epoxides beginning with $C_3$ (allene), e.g. epoxides of 1–4 pentadiene, 1–5 hexadiene, etc.

(d) Same range for conjugated diolefin epoxides, branched and straight chain, and alkyl, aryl, carboxyl, chlorine and fluorine substituted conjugated diolefin epoxides beginning with $C_4$, e.g. epoxides of 1–3 butadiene, isoprene, chloroprene, etc.

(e) Same range for conjugated and unconjugated cyclic diolefin epoxides and alkyl, aryl, carboxyl, chlorine and fluorine substituted cyclic diolefin epoxides beginning with the $C_4$ ring, e.g. epoxides of cyclobutadienes, cyclopentadienes, cyclohexadienes, cyclohexadienecarboxylic acids, cycloheptadienes and cyclooctadienes.

(f) Same range for noncyclic and cyclic triolefin epoxides and substituted triolefin epoxides including as substituents alkyl groups, aryl groups, carboxyl groups, chlorine, fluorine, etc., beginning with $C_6$, e.g. epoxides of cycloheptatrienes, cyclooctatrienes, 1,3,5 - hexatriene, heptatrienes, etc.

(g) Same range for epoxides of other nonhydrocarbon feeds including fatty acids, furan, thiophene, 1,4-pyrone, alkyl- and aryl-substituted thiophenes, unsaturated alcohols, e.g. epoxides of allyl alcohol, etc.

The sulfur-containing compound with which the epoxide is reacted may be carbonyl sulfide or carbon disulfide; both of which have been found to yield similar results in the synthesis of episulfides in accordance with this invention.

The present invention may be carried out under the following preferred conditions:

(1) Temperatures in the range of 0 to 500° C., preferably 30 to 400° C., more preferably 100–250° C., still more preferably 100–200° C., e.g. 150° C.

(2) Pressures in the range of 0.1 to 50 atmospheres, preferably 1 to 5 atmospheres, e.g. 1 atmosphere.

(3) Mole ratios of COS or $CS_2$ to epoxide in the range of 1/10 to 1000/1, preferably 0.5/1 to 100/1, more preferably 1/1 to 10/1, still more preferably 1/1 to 3/1, e.g. 2/1.

(4) Reaction times in the range of 0.1 second to 1 hour, preferably 0.1 minute to 0.25 hour, more preferably 10 seconds to 5 minutes.

(5) Flow rates of 0.05 to 1.0 volumes of feed per volume of catalyst bed per hour, preferably 0.1 to 1.0, and more preferably 0.1 to 0.5, e.g. 0.25.

In a preferred embodiment, the reaction is carried out in a flow reactor having an L/D of 3:1 to 25:1 at reaction times of 3 seconds to 10 minutes. Also, in a preferred embodiment conditions are utilized to obtain high conversions per pass of 50 to 95% and the desired products, e.g. episulfides, are removed from the product by absorption, extraction, etc. The remaining reaction products are recycled to extinction to thereby obtain high overall conversions and yields.

The present invention will be more clearly understood from a consideration of the following examples.

EXAMPLE 1

Reaction of $C_3O$ with $CS_2$ over various oxide catalysts

Propylene oxide and carbon disulfide were introduced through rotameters into a vertically mounted pyrex glass reactor (12½ inches long by 1 inch ID) contained in a furnace. The laboratory equipment was valved so as to permit mass chromatographic sampling of both the entering and product gases from the reactor. The flow rates of carbon disulfide and propylene oxide were about 12–15 cc./hr. and the reactor was packed with catalyst and maintained at 280° C. and atmospheric pressure. The molar ratio of carbon disulfide to propylene oxide was 1:1. The following results were obtained with various metal oxide catalysts:

| Catalyst: | Selectivity, mols episulfide per mol propylene oxide reacted, percent | Yield, mols episulfide per mol propylene oxide, percent |
|---|---|---|
| MgO | 43 | 16 |
| SrO | 9 | 1 |
| ZnO | Nil | Nil |
| CdO | (1) | (1) |
| NiO | Nil | Nil |
| BeO | 1 | Nil |

1 Trace.

These results show that only MgO is a satisfactory catalyst for promoting episulfide synthesis according to this invention.

EXAMPLE 2

Reaction of $CS_2$ and $C_3O$ over various hydroxide catalysts

In equipment similar to that used in Example 1 and at temperatures of 250–280° C. at atmospheric pressure, $CS_2$ and propylene oxide in a molar ratio of 1:1 and a throughput of 0.11–0.44 v./v./hr. were reacted over several sulfide catalysts. The results shown below indicate the relative activity of BaS as a catalyst for promoting episulfide formation as compared with other sulfides:

| Catalyst: | Selectivity, mols episulfide per mol propylene oxide reacted, percent | Yield, mols episulfide per mol propylene oxide, percent |
|---|---|---|
| CdS | (1) | (1) |
| CaS | 11 | Nil |
| BaS | 32 | 4.2 |
| ZnS | Nil | Nil |

1 Trace.

Optimization of reaction conditions would increase the episulfide yield over a BaS catalyst.

EXAMPLE 3

Reaction of $CS_2$ and $C_3O$ over various hydroxide catalysts

In equipment similar to that used in Example 1, and at a temperature of 150° C. at atmospheric pressure, carbon disulfide was reacted with propylene oxide in a molar ratio of 1:1, with a throughput of 1.0 LHSV. The results shown below indicate the relative activity of $Mg(OH)_2$ as a catalyst for promoting episulfide formation:

| Catalyst: | Selectivity, mols episulfide per mol propylene oxide reacted, percent | Yield, mols episulfide per mol propylene oxide, percent |
|---|---|---|
| $Mg(OH)_2$ | 65 | 6.8 |
| $Sr(OH)_2 \cdot 8H_2O$ | Nil | 0.6 |
| $Ba(OH)_2 \cdot 8H_2O$ | Nil | 0.9 |

EXAMPLE 4

Reaction of COS and $C_3O$ at various temperatures over MgO

In equipment similar to that used in Example 1, carbonyl sulfide was reacted with propylene oxide over a high purity MgO catalyst (Fisher Certified Reagent). The molar ratio of $COS/C_3O$ was 1.5/1, pressure was atmospheric and the throughput, calculated on a weight hourly space velocity basis, was 0.41–0.47 w./w./hour. The following results indicate that temperatures of about 150° C. produce the best results for this reaction:

| Temperature, ° C.: | $C_3O$ converted, percent | $C_3S$ selectivity, percent | $C_3S$ yield, percent |
|---|---|---|---|
| 100 | 48 | 48 | 23 |
| 150 | 49 | 56 | 27 |
| 200 | 38 | 33 | 13 |

This reaction indicates that carbonyl sulfide and carbon disulfide may be used interchangeably in the process of this invention. Comparison of these results with those of Example 7, below, indicate that carbonyl sulfide will react more readily than carbon disulfide to form the desired episulfides. However, $CS_2$, the less expensive reactant, was utilized to determine catalyst activity.

EXAMPLE 5

Life test of MgO in reaction of $CS_2$ with $C_3O$

In equipment similar to that used in Example 1, a life study of MgO catalyst was conducted. Carbon disulfide and propylene oxide in a molar ratio of 2:1, and a space velocity of 0.5 LHSV, were reacted at 200° C. and atmospheric pressure. Fisher Certified Reagent grade MgO (8–16 mesh) was used as the catalyst.

| Sample period, hr | 3rd | 10th |
|---|---|---|
| Conversion of propylene oxide, percent | 25 | 12 |
| Conversion of $CS_2$, percent | 9 | 5 |
| Selectivity to propylene episulfide, percent | 60 | 68 |
| Yield of propylene episulfide | 15 | 8 |

These results indicate that catalyst activity with respect to $CS_2$ and $C_3O$ decreased with time; however, selectivity increased slightly. This example shows the feasibility of conducting relatively long-time continuous reactions.

EXAMPLE 6

Reaction condition parameters with MgO catalyst

Figure 2:
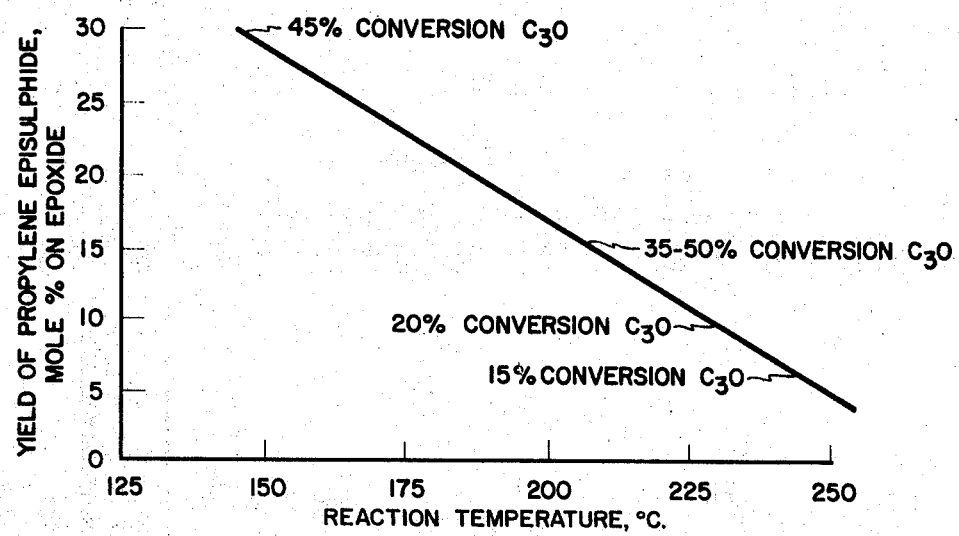
Figure 3:
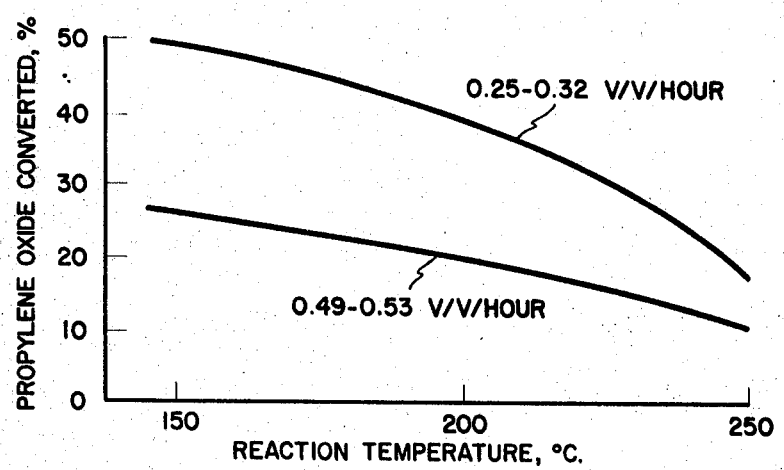

The same equipment as used in Example 1 was employed to determine the influence of certain reaction parameters, i.e. temperature, mole ratio, and space velocity at atmospheric pressure, on the conversion (oxide reacted/oxide feed), selectivity (sulfide formed/oxide reacted) and yield of episulfide obtained with MgO as the catalyst. Results obtained are shown in the accompanying drawings. FIG. 1 shows the yield, episulfide selectivity, and propylene oxide conversion as a function of molar ratio of $CS_2$/propylene oxide, at 200° C., atmospheric pressure and a space velocity of 0.5 v./v./hr. FIG. 2 shows the episulfide yield as a function of reaction temperature, and FIG. 3 shows the propylene oxide conversion at two different space velocities as a function of temperature.

Referring to FIG. 1, it can be seen that yield and selectivity increase with increasing molar ratios of carbon disulfide to propylene oxide. Conversion of propylene oxide increases with increasing mole ratio to a maximum between a ratio of 2/1 to 3/1 of $CS_2/C_3O$. It is interesting to note that although the conversion drops off slightly at a ratio of 3/1, the yield increases because of increasing selectivity. FIG. 2 indicates that greater episulfide yields and propylene oxide conversions are obtained at reaction temperatures in the lower end of the preferred range. Similarly, in FIG. 3, greater conversions of propylene oxide are shown at lower temperatures and also at lower space velocities.

EXAMPLE 7

Addition of water to reaction between $CS_2$ and $C_3O$

In equipment similar to that used in Example 1, carbon disulfide and propylene oxide in a molar ratio of 1:1, were reacted at 280° C. and atmospheric pressure over a 4–10 mesh Fisher Certified Reagent grade MgO catalyst. The throughput of the reactants was 0.11 v./v./hr. The following results indicate the effect of adding water to the feed for increasing episulfide yield:

| Water added | Conversion of propylene oxide, percent | Selectivity, percent | Yield, percent |
| --- | --- | --- | --- |
| None | 46 | 33 | 15.2 |
| 1 mole percent (0.36 g./hr.) | 72 | 33 | 24 |

It should be noted that the selectivity remained constant, but the conversion increased considerably, thereby resulting in greater yields of episulfide. Consequently, it is not necessary to completely dry the catalysts before conducting the reaction.

EXAMPLE 8

Effect of catalyst calcination on MgO

In equipment similar to that used in Example 1, an episulfide synthesis was conducted with an MgO catalyst (4–10 mesh Fisher Certified Reagent) to determine the effect of calcination prior to conducting the episulfide synthesis.

At 280° C. and atmospheric pressure, $CS_2$ and $C_3O$ in a molar ratio of 1/1 were fed to the reactor at a throughput of 0.10 v./v./hr. The results are as shown below:

| Pretreatment | Conversion, percent | Selectivity, percent | Yield, percent |
| --- | --- | --- | --- |
| None | 94 | 20 | 19 |
| 2 hrs. at 400–450° C. | 46 | 33 | 15.2 |

This example shows higher conversions with an untreated catalyst, confirming the result of Example 7 where the addition of water to the feed increases the conversion of propylene oxide (since calcination serves to remove the water).

EXAMPLE 9

Effect of catalyst calcination on $Mg(OH)_2$

In equipment similar to that used in Example 1, an episulfide synthesis was conducted with an $Mg(OH)_2$ catalyst to determine the effect of catalyst calcination prior to conducting the episulfide synthesis.

At 150° C. and atmospheric pressure, $CS_2$ and $C_3O$ in a molar ratio of 1/1 were fed to the reactor at a throughput of 1.0 LHSV. The results are as shown below:

| Pretreatment | Conversion, percent | Selectivity, percent | Yield, percent |
| --- | --- | --- | --- |
| None | 26 | 34 | 9.2 |
| 0.75 hrs. at 150–170° C. | 11 | 65 | 6.8 |

Again, conversion is increased with no catalyst pretreatment, probably due to increased moisture content.

EXAMPLE 10

Reaction of $CS_2$ with butadiene oxide

In equipment similar to that used in Example 1, butadiene oxide is used as the epoxide, $CS_2$ as the source of sulfur, and magnesium oxide as the catalyst. Butadiene episulfide, i.e. the unsaturated episulfide, is obtained with good selectivity and yield.

EXAMPLE 11

Reaction of $CS_2$ with propylene oxide over 98% MgO catalyst

This example shows the versatility of the preferred MgO catalyst. The catalyst was ball milled to 4–10 mesh with 2% graphite added to the mixture. $CS_2$ and $C_3O$ in a 1/1 mole ratio were reacted at 250° C. in equipment similar to that used in Example 1. Conversion of $C_3O$ was 12%, selectivity to episulfide was 44% and the episulfide yield was 5.5%. In a similar experiment a 98% MgO containing 2% graphite was obtained initially. Under the same reaction conditions the $C_3O$ conversion was 22%, the episulfide selectivity was 23%, and the episulfide yield was 5%. The episulfide yield is normally lower at temperatures of about 250° C. and over.

What is claimed is:

1. A process for the synthesis of episulfides which comprises reacting a $C_2$–$C_{12}$ straight chain or branched chain epoxide with a sulfur compound selected from the group consisting of carbon disulfide and carbonyl sulfide in the vapor phase at a temperature varying from 100 to 250° C. in the presence of from about 0.5 to 2.5 mol percent water, based upon sulfur compound and epoxide, and a solid catalyst selected from the group consisting of magnesium oxide, magnesium hydroxide and barium sulfide and thereafter recovering an episulfide product.

2. The process of claim 1 wherein said epoxide is propylene oxide.

3. The process of claim 1 in which said reaction is conducted within a reaction zone containing a fixed bed of catalyst and the flow rate of sulfur compound and epoxide feed to said reaction zone is from 0.5 to 1.0 volumes of sulfur compound and epoxide feed per volume of catalyst per hour.

4. The process of claim 1 wherein said epoxide is an unsaturated epoxide.

5. The process of claim 1 wherein said epoxide is a saturated epoxide.

6. The process of claim 1 in which the catalyst is MgO.

7. The process of claim 1 in which the catalyst is $Mg(OH)_2$.

8. The process of claim 1 in which the catalyst is BaS.

9. The process of claim 1 in which the mole ratio of the sulfur compound to the epoxide is from 1/1 to 10/1.

10. The process for the synthesis of episulfides which comprises reacting a $C_2$–$C_{12}$ straight chain or branched chain epoxide with a sulfur compound selected from the group consisting of carbon disulfide and carbonyl sulfide in the vapor phase at a temperature varying from 100 to 250° C. in the presence of a solid catalyst selected from the group consisting of magnesium hydroxide and barium sulfide and thereafter recovering an episulfide product.

11. The process of claim 14 wherein said epoxide is propylene oxide.

12. The process of claim 10 wherein said epoxide is propylene oxide.

13. The process of claim 10 wherein said catalyst is barium sulfide.

14. The process of claim 10 wherein said reaction is conducted in the presence of from 0.5 to 2.5 mol percent water, based on said sulfur compound and epoxide.

References Cited

UNITED STATES PATENTS

| 3,073,846 | 1/1963 | Millikan | 260—327 |
| 3,213,108 | 10/1965 | Osborn et al. | 260—327 |
| 3,426,039 | 2/1969 | Osborn et al. | 260—327 |

OTHER REFERENCES

Durden et al.: Jour. Amer. Chem. Soc., vol. 82, 1960, pp. 3032–4.

JAMES A. PATTEN, Primary Examiner

U.S. Cl. X.R.

260—329